US012797840B2

(12) United States Patent
Koo et al.

(10) Patent No.: US 12,797,840 B2
(45) Date of Patent: Nov. 17, 2026

(54) NI CATALYST FOR AMMONIA DECOMPOSITION FOR HYDROGEN PRODUCTION AND MANUFACTURING METHOD THEREOF

(71) Applicant: KOREA INSTITUTE OF ENERGY RESEARCH, Daejeon (KR)

(72) Inventors: Kee Young Koo, Daejeon (KR); Ji Yu Kim, Daejeon (KR); Un Ho Jung, Daejeon (KR); Yong Ha Park, Cheonan-si (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 516 days.

(21) Appl. No.: 18/242,420

(22) Filed: Sep. 5, 2023

(65) Prior Publication Data

US 2024/0157351 A1 May 16, 2024

(30) Foreign Application Priority Data

Nov. 15, 2022 (KR) ........................ 10-2022-0152843

(51) Int. Cl.
*B01J 37/34* (2006.01)
*B01J 23/755* (2006.01)
(Continued)

(52) U.S. Cl.
CPC ........... *B01J 37/343* (2013.01); *B01J 23/755* (2013.01); *B01J 29/072* (2013.01); *B01J 35/392* (2024.01);
(Continued)

(58) Field of Classification Search
CPC ...... B01J 37/343; B01J 35/394; B01J 35/393; B01J 35/615; B01J 35/633; B01J 35/392; B01J 35/635; B01J 35/617; B01J 23/755; B01J 29/072; B01J 37/0201; B01J 37/035; B01J 37/082; C01B 3/047; C01P 2004/64
(Continued)

(56) References Cited

FOREIGN PATENT DOCUMENTS

| | | | | | |
|---|---|---|---|---|---|
| EP | 3632543 | A1 | * | 4/2020 | B01J 29/46 |
| JP | H1133412 | A | * | 2/1999 | B01J 23/42 |

(Continued)

OTHER PUBLICATIONS

English translation of the Korean Office Action for the Korean Application No. 10-2022-0152843, dated Nov. 4, 2024.

(Continued)

*Primary Examiner* — Patricia L. Hailey
(74) *Attorney, Agent, or Firm* — Birch, Stewart, Kolasch & Birch, LLP

(57) ABSTRACT

An example of the present invention provides a metal composite catalyst for ammonia decomposition and hydrogen production including a carrier; and Ni metal particles dispersed on a surface of the carrier or inside a pore, in which a content of the Ni metal particle is 15 to 70 parts by weight with reference to 100 parts by weight of the metal composite catalyst, and a diameter of the Ni metal particle is 60 nm or less. More specifically, the metal composite catalyst according to an example of the present invention is manufactured by an ultrasonic method, includes an aging step, and exhibits high efficiency and economy in ammonia decomposition and hydrogen production processes.

14 Claims, 5 Drawing Sheets

(51) Int. Cl.

| | |
|---|---|
| ***B01J 29/072*** | (2006.01) |
| ***B01J 35/30*** | (2024.01) |
| ***B01J 35/61*** | (2024.01) |
| ***B01J 35/63*** | (2024.01) |
| ***B01J 37/02*** | (2006.01) |
| ***B01J 37/03*** | (2006.01) |
| ***B01J 37/08*** | (2006.01) |
| ***C01B 3/047*** | (2026.01) |

(52) U.S. Cl.

CPC ........... *B01J 35/393* (2024.01); *B01J 35/394* (2024.01); *B01J 35/615* (2024.01); *B01J 35/617* (2024.01); *B01J 35/633* (2024.01); *B01J 35/635* (2024.01); *B01J 37/0201* (2013.01); *B01J 37/035* (2013.01); *B01J 37/082* (2013.01); *C01B 3/047* (2013.01)

(58) Field of Classification Search

USPC ................ 502/5, 337; 423/237, 239.1, 648.1

See application file for complete search history.

(56) References Cited

FOREIGN PATENT DOCUMENTS

| | | | | | |
|---|---|---|---|---|---|
| JP | 2011224555 A | * | 11/2011 | .............. | B01J 23/76 |
| JP | 2018023938 A | * | 2/2018 | .............. | B01J 23/76 |

OTHER PUBLICATIONS

Liu et al., "Preparation, characterization and activities of the nano-sized Ni/SBA-15 catalyst for producing COx-free hydrogen from ammonia," Applied Catalysis A: General 337, 2008, pp. 138-147.

Machine translation of KR-10-2022-0128865-A, published on Sep. 22, 2022.

* cited by examiner

NI CATALYST FOR AMMONIA DECOMPOSITION FOR HYDROGEN PRODUCTION AND MANUFACTURING METHOD THEREOF

BACKGROUND OF THE INVENTION

Field of the Invention

The present invention relates to a metal composite catalyst for ammonia decomposition and hydrogen production, and more particularly, to a Ni composite catalyst manufactured by applying an ultrasonic method and a manufacturing method thereof.

Description of the Related Art

In recent years, many difficulties have arisen throughout the entire industry due to the abnormal climate that is progressing around the world. The biggest cause of abnormal climate is global warming due to the continuous use of fossil fuels. In particular, in East Asia, there has been no significant difference in the change in average temperature from 1996 to 2005, but a rapid increase has been observed from the middle of the 21st century, and it is confirmed that the global average temperature has increased by about 0.85° C. for 133 years from 1880 to 2012.

If the global temperature rises by 2° C., about 15 to 40% of species may become extinct. In order to prevent the extinction, countries around the world proposed measures such as reduction of greenhouse gas emissions by half by 2030, emphasized the importance of being carbon neutral, reduced greenhouse gas emissions as much as possible, and absorbed and reused greenhouse gases so as to step into a state in which the actual emission is zero (IPCC 6th report).

In order to achieve carbon neutrality, it is necessary to reduce the use of energy using coal and natural gas, and to use carbon-free fuel. To this end, alternative energy is required, and recently, technology development and commercialization based on renewable energy are in progress. However, in the case of renewable energy, problems may arise in energy supply due to geographical and natural factors.

Recently, hydrogen has been in the limelight as an alternative energy that can store electricity, which can be produced and consumed in real-time, as a medium to compensate for the intermittence and variability of renewable energy, and a number of related research and demonstration projects are in progress. Power generation by using hydrogen is known as an eco-friendly power generation that produces heat and electricity with high energy efficiency without emitting harmful gases such as carbon dioxide. According to the Hydrogen Council, global hydrogen demand is expected to increase to about 100 million tons in 2030 and 550 million tons in 2050.

However, since the method of storing and transporting hydrogen as high-pressure gaseous hydrogen is mainly used, there are disadvantages of a risk of explosion, high cost, and a limited storage amount.

Hydrogen requires a fuel storage tank equivalent to about 7.6 times that of conventional fossil fuels due to the increase in the thickness of the insulation material. Meanwhile, the volumetric hydrogen energy density of ammonia is 121 kg/m$^3$, which is greater than that of liquefied hydrogen (70.8 kg/m$^3$), and thus ammonia is used in various industries. More specifically, when the cost of transporting through pipelines is considered, the cost of transporting hydrogen is about USD 1.87, but the cost of transporting ammonia is USD 0.19 which is about 10%. In addition, in terms of storage, when hydrogen is stored for six months, production, transportation, and storage cost USD 19.82 for hydrogen but cost USD 4.53 for ammonia, indicating that hydrogen costs about 4.3 times higher.

The method of storing hydrogen in the form of ammonia is well known for transportation and storage, but ammonia decomposition requires high temperature and a large amount of system energy, and thus it is required to develop a catalyst for ammonia decomposition.

Ruthenium (Ru) is an active metal widely used in the field of ammonia decomposition ($NH_3 \rightarrow 1/2N_2+3/2H_2$) and shows high activity in the ammonia decomposition reaction. However, ruthenium is greatly affected by particle shapes and sizes and has difficulties in application in terms of scarcity and economic feasibility. Therefore, it is required to develop an active metal catalyst that can replace ruthenium.

Nickel (Ni) has high activity among non-noble metal catalysts, is more abundantly distributed on the earth than ruthenium, and is inexpensive, thereby being economical. The catalyst can be supplied at a price up to 70 times lower than when using ruthenium, but the interaction with ammonia molecules is weak, thereby resulting in poor performance. Accordingly, a high temperature of 600 degrees or more is required in order to activate ammonia molecule.

Zeolite is a material including cages and channels enabling material movement into the skeleton by connecting structures (T=Al, Si) in which $TO_4$ is repeated and has a high specific surface area and micropores. Therefore, zeolite can be used as a catalyst support that can maintain high dispersion of metal. In addition, zeolite can be used as a support for causing Ni to be highly dispersed by using micropores and high specific surface area characteristics of zeolite.

Ultrasonics refer to periodic sound pressure having a frequency exceeding the maximum audible range in which humans can hear. Sound waves that humans can hear generally have a frequency in the range of 16 Hz to 20 kHz, but ultrasonics refer to sound having a frequency of 20 kHz and is a sound wave different from radio waves and electromagnetic waves.

In the mechanism of the ultrasonic reaction used in the present invention, when ultrasonics are applied into a liquid phase, a sound field is formed according to the environmental conditions inside the reactor, and a series of phenomena in which cavitation bubbles are generated, grown, and exploded by various sound pressures in the sound field occur innumerable times. In this course, various physical and chemical ultrasonic effects are generated.

SUMMARY OF THE INVENTION

The present invention requires a high content of Ni active metal highly dispersed and uniformly supported, in order to manufacture a metal composite catalyst for ammonia decomposition and hydrogen production with excellent low-temperature activity. Therefore, by using the large specific surface area of zeolite, it is intended to solve the problem that it is difficult to uniformly support a high content of Ni active metal in a highly dispersed manner by existing catalyst support methods such as ion exchange, impregnation, and precipitation.

The present invention has been conceived to solve the above-described problems, and one embodiment of the present invention provides a metal composite catalyst for ammonia decomposition and hydrogen production.

In addition, another embodiment of the present invention provides a method of manufacturing a metal composite catalyst for ammonia decomposition and hydrogen production.

The technical problem to be achieved by the present invention is not limited to the above-described technical problem, and other technical problems not mentioned can be clearly understood by a person having ordinary skill in the art to which the invention pertains from the description below.

As a technical method for achieving the above-described technical problem, an aspect of the present invention provides a metal composite catalyst for ammonia decomposition and hydrogen production including a carrier; and Ni metal particles dispersed on a surface of the carrier or inside a pore, in which a content of the Ni metal particle is 15 to 70 parts by weight with reference to 100 parts by weight of the metal composite catalyst, and a diameter of the Ni metal particle is 60 nm or less.

A metal dispersion of the Ni metal particle in the metal composite catalyst may be 1.6% to 10%.

A BET surface area of the metal composite catalyst may be 130 to 700 $m^2/g$.

A total pore volume of the metal composite catalyst may be 0.10 or more and less than 0.50 $cm^3/g$.

A metal surface area of the metal composite catalyst may be 2 to 20 $m^2/g$.

The carrier may be zeolite or an oxide of at least one transition metal selected from the group consisting of magnesium, aluminum, iron, manganese, nickel, cobalt, titanium, silicon, and zinc.

The Ni metal particles may be dispersed on the surface of the carrier or inside the pore by applying ultrasonics.

After the ultrasonic is applied, the metal composite catalyst for ammonia decomposition and hydrogen production may be aged in a liquid phase.

Another aspect of the present invention provides a method of manufacturing a metal composite catalyst for ammonia decomposition and hydrogen production including: preparing a mixture by adding a Ni precursor, a carrier, and a precipitant to a solvent; applying an ultrasonic to the mixture; aging the mixture to which ultrasonics are applied; and calcining the aged mixture.

The precipitant may be a base solution.

The precipitant may be urea, potassium hydroxide (KOH), sodium hydroxide (NaOH), or ammonia water.

In the applying of ultrasonics to the mixture, an output of energy of the ultrasonics may be 100 to 600 W.

The applying of the ultrasonics to the mixture may be performed for 10 minutes to 60 minutes.

In the aging of the mixture to which the ultrasonics are applied, the mixture may be stirred at a temperature condition of 80° C. to 90° C. and aged.

In the aging of the mixture to which the ultrasonics are applied, the mixture may be stirred for 20 to 180 minutes and aged.

DETAILED DESCRIPTION OF THE PREFERRED EMBODIMENTS

Figure 1:
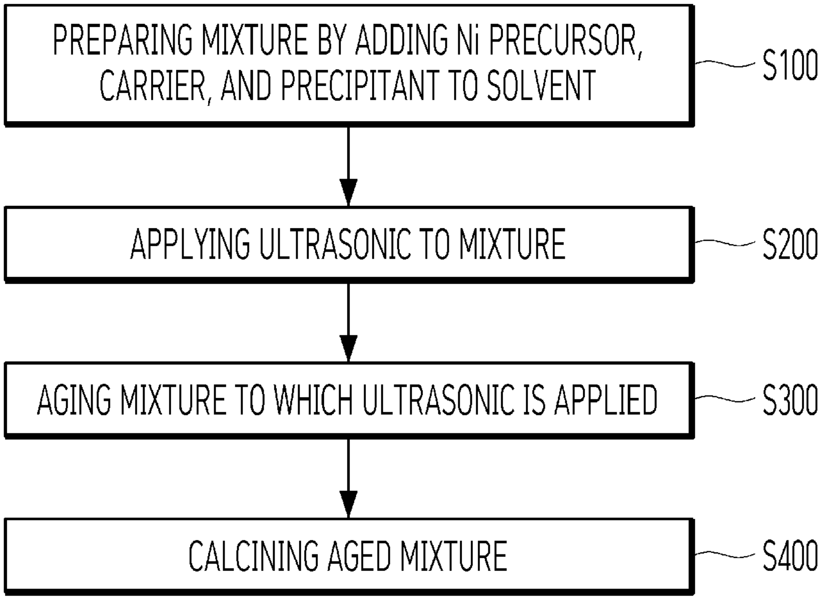
FIG. 1 is a flow chart showing a method of manufacturing a metal composite catalyst for ammonia decomposition and hydrogen production according to an embodiment of the present invention.

Hereinafter, the present invention is described in more detail. However, the present invention can be implemented in many different forms, and the present invention is not limited by the embodiments described herein and is only defined by the claims described below.

In addition, terms used in the present invention are only used to describe specific embodiments and are not intended to limit the present invention. Unless the context clearly dictates otherwise, expressions in singular forms include expressions in plural forms. In the entire specification of the present invention, 'including' a certain element does not mean excluding other elements unless otherwise stated but means that other elements may be further included.

A first aspect of the present application provides a metal composite catalyst for ammonia decomposition and hydrogen production including: a carrier; and Ni metal particles dispersed on a surface of the carrier or inside a pore, in which a content of the Ni metal particle is 15 to 70 parts by weight with reference to 100 parts by weight of the metal composite catalyst, and a diameter of the Ni metal particle is 60 nm or less.

Hereinafter, the metal composite catalyst for ammonia decomposition and hydrogen production according to the first aspect of the present application is specifically described.

According to an embodiment of the present application, the carrier may be zeolite or, an oxide of at least one transition metal selected from the group consisting of magnesium, aluminum, iron, manganese, nickel, cobalt, titanium, silicon, and zinc. The oxide of the transition metal may be an oxide of lanthanide metal, transition metal, and metal selected from the group consisting of, for example, magnesium, aluminum, zinc, gallium, cadmium, manganese, indium, iron, nickel, cobalt, tin, mercury, titanium, lead, bismuth, polonium, and an alloy containing the same. In particular, an oxide of metal selected from the group consisting of lanthanide metal, transition metal, aluminum, and alloys including the same among the above-described metal is preferable. The oxide of the transition metal may be an oxide of at least one transition metal selected from the group consisting of magnesium, aluminum, iron, manganese, nickel, cobalt, titanium, silicon, and zinc. The oxide of the transition metal is most preferably zeolite.

According to an embodiment of the present application, the zeolite may include cages and channels enabling material movement into the skeleton by connecting structures structures (T=Al, Si) in which TO4 is repeated. The zeolite has a high specific surface area and micropores and can be used as a catalyst support capable of maintaining a high dispersion of metal, and can help improve thermal stability and activity through strong metal support interaction (SMSI) with metal supported on the porous support.

According to an embodiment of the present application, the metal dispersion of the Ni metal particle according to the metal composite catalyst may be 1.5% or more, 1.6% or more, 2.5% or more, 3% or more, or 4% or more, may be 12% or less, 10% or less, 8% or less, or 6% or less, and is most preferably 1.6% to 10%. If the metal dispersion is less than the above-described range, the active metal may not be uniformly supported, and thus the catalytic activity may be low.

According to an embodiment of the present application, the BET surface area of the metal composite catalyst may be 110 $m^2/g$ or more, 115 $m^2/g$ or more, 120 $m^2/g$ or more, or 125 $m^2/g$ or more, may be 800 $m^2/g$ or less, 775 $m^2/g$ or less, 750 $m^2/g$ or less, or 725 $m^2/g$ or less, and may be most preferably 130 to 700 $m^2/g$. When the BET surface area exceeds the above-described range, the volume of the metal composite catalyst may be unnecessarily increased, or a required level of strength may not be secured. When the BET surface area is below the above-described range, ammonia decomposition efficiency may be reduced.

According to an embodiment of the present application, the metal composite catalyst have a porous structure and, specifically, may include both micropores and mesopores. The total pore volume of the metal composite catalyst may be defined as the sum of the micropore volume and the mesopore volume, and other pore volumes may be further included.

In one embodiment of the present application, the total pore volume of the metal composite catalyst may be 0.05 $cm^3/g$ or more, 0.06 $cm^3/g$ or more, 0.07 $cm^3/g$ or more, 0.08 $cm^3/g$ or more, and 0.09 $cm^3/g$ or more, may be 0.45 $cm^3/g$ or less, 0.42 $cm^3/g$ or less, or 0.38 $cm^3/g$ or less, and may be most preferably 0.10 to 0.50 $cm^3/g$. When the total pore volume exceeds the above-described range, the volume of the metal composite catalyst may be unnecessarily increased, or a required level of strength may not be secured. When the total pore volume is less than the above-described range, the ammonia decomposition efficiency may be reduced.

According to an embodiment of the present application, the metal surface area of the metal composite catalyst may be 2.2 $m^2/g$ or more, 2.4 $m^2/g$ or more, 2.6 $m^2/g$ or more, 2.8 $m^2/g$ or more, or 3.0 $m^2/g$ or more, may be 18 $m^2/g$ or less, 17 $m^2/g$ or less, 16 $m^2/g$ or less, 15 $m^2/g$ or less, or 14 $m^2/g$ or less, and may be most preferably 2 to 20 $m^2/g$. When the metal surface area is less than the above-described range, uniform dispersion is difficult, and metal activity is not sufficiently achieved making it difficult to obtain a catalyst in a controllable range, and thus difficult to manufacture.

According to an embodiment of the present application, the zeolite preferably used as the carrier can cause ion exchange, impregnation, and precipitation, which are conventional catalyst support methods that were difficult to uniformly support a highly-dispersed Ni active metal in high content, to be more efficient by using a large specific surface area.

According to an embodiment of the present application, the ion exchange can cause Ni to be supported only at sites where metal cations can be exchanged, and thus the content of Ni that can be highly dispersed and supported is very limited. The impregnation is a traditional active metal loading method. Though the method is simple, when a high content of active metal of 20 wt % or more is supported, particles aggregate, and thus there is tendency that the particle size becomes large and dispersion decreases. The precipitation is generally used for highly dispersed support of a high content of active metal but has a disadvantage in that the aging process, which is the particle formation step in the manufacturing process, takes a long period of time. Therefore, in the invention of the present application, a metal composite catalyst is manufactured by using an ultrasonic method.

In an embodiment of the present application, the Ni metal particles are dispersed on the surface of the carrier or inside the pores by applying ultrasonics. The ultrasonic method applies ultrasonic energy to a precursor solution for supporting active metal so that fine bubbles can be formed in the precursor solution owing to acoustic cavitation, and induces continuous growth and cleaving so that nano-sized particles can be uniformly formed on the surface of the carrier. In the mechanism of the ultrasonic reaction, if ultrasonics are applied to the liquid phase, a sound field is formed according to the environmental conditions inside the reactor, sound pressures of various magnitudes in this sound field innumerably cause a series of phenomena in which cavitation bubbles form, grow, and explode, and various physical and chemical ultrasonic effects are generated in this course.

In an embodiment of the present application, the metal composite catalyst for ammonia decomposition and hydrogen production is aged in the liquid phase after the ultrasonics are applied. This enables Ni metal of 30 wt % or more, of which active metal is difficult to be dispersed highly and supported uniformly by the impregnation that is the catalyst manufacturing method in the related art, can be uniformly supported on the surface of the carrier by an ultrasonic treatment, and a highly dispersed and uniformly supported Ni catalyst of 50 wt % or more can be manufactured by combining ultrasonic energy and a short aging step.

A second aspect of the present application provides a method of manufacturing a metal composite catalyst for ammonia decomposition and hydrogen production including: preparing a mixture by adding a Ni precursor, a carrier, and a precipitant to a solvent; applying an ultrasonic to the mixture; aging the mixture to which ultrasonics are applied; and calcining the aged mixture.

Detailed descriptions of portions overlapping with those of the first aspect of the present application are omitted, but the contents described for the first aspect of the present application can be equally applied even if the description is omitted from the second aspect.

Hereinafter, the method of manufacturing a metal composite catalyst for ammonia decomposition and hydrogen production according to the second aspect of the present disclosure is described with reference to the flowchart of FIG. 1.

First, in an embodiment of the present application, a step S100 of preparing a mixture by adding a Ni precursor, a carrier, and a precipitant to a solvent may be included.

In one embodiment of the present application, the precipitant is a base solution, more specifically may be at least one selected from the group consisting of sodium hydroxide (NaOH), potassium hydroxide (KOH), calcium hydroxide ($Ca(OH)_2$), ammonia water ($NH_4OH$, Ammonia; Hydroxylamine), magnesium hydroxide ($Mg(OH)_2$), urea ($CH_4N_2O$), and mixtures thereof, and may be most preferably urea ($CH_4N_2O$), potassium hydroxide (KOH), sodium hydroxide (NaOH), or ammonia water ($NH_4OH$, Ammonia; Hydroxylamine).

In an embodiment of the present application, the Ni precursor is at least one selected from the group consisting of nickel nitrate, nickel acetone salt, nickel acetate, nickel acetelacetonate salt, nickel sulfate, nickel chloride, nickel halide, and mixtures thereof and may be preferably nickel nitrate.

Next, in an embodiment of the present application, a step S200 of applying ultrasonic to the mixture may be included. In the ultrasonic method, fine bubbles can be formed in the precursor solution owing to ultrasonic cavitation by applying ultrasonic energy to a precursor solution for supporting active metal, and continuous growth and cleaving are induced to form nano-sized particles on the surface of the carrier.

According to an embodiment of the present application, an output of energy of ultrasonics may be 150 W or more, 200 W or more, 250 W or more, or 300 W or more, may be 550 W or less, 500 W or less, 450 W or less, or 400 W or less, and may be most preferably 100 to 400 W. If the output exceeds the above-described range, a particle destruction rate due to vibration by high energy increases so that it may be difficult to achieve appropriate catalytic activities. If the output is less than the above-described range, the metal particle is formed with the large size due to small energy, and aggregation between particles may be intensified.

In an embodiment of the present application, the applying of ultrasonics to the mixture may be performed for 15 minutes to 50 minutes, 20 minutes to 40 minutes, and 25 minutes to 35 minutes and may be most preferably performed for 28 minutes to 32 minutes. If the application time is less than the above-described range, the metal particles may not be sufficiently dispersed in the carrier or the particle size may become large. If the application time exceeds the above-described range, the composite catalyst itself may be damaged or the application may be inefficient in terms of energy.

Next, in an embodiment of the present application, a step S300 of aging the mixture to which ultrasonics are applied may be included. By the step S300, the complexation is performed in a state in which the nickel metal particles are uniformly dispersed in the carrier, and the composite catalyst particles can be stabilized before a calcining step. In the aging step, the aging is preferably performed by stirring the mixture in the temperature condition of 80° C. to 90° C. If the temperature exceeds the above-described temperature condition, waste heat generation or the like occurs, and thus it is inefficient in terms of energy. If the temperature is lower than the above-described temperature range, the aging may not be completely performed.

In an embodiment of the present application, the step of aging the mixture to which ultrasonics are applied is most preferable if the mixture is aged by stirring for 20 to 180 minutes. If the aging time exceeds the time range, the efficiency of the catalyst may be reduced due to over-aging, and the aging is inefficient in terms of energy. If the aging time less than the above-described time range, the aging process itself becomes meaningless.

In an embodiment of the present application, a step S400 of calcining the aged mixture may be included. The calcining step may be performed at a temperature condition of 200° C. to 600° C. and more preferably at a temperature condition of 300° C. to 500° C. If the calcination temperature exceeds the above-described temperature condition, waste heat generation or the like occurs, and thus the calcining is inefficient in terms of energy. If the calcination temperature is less than the above temperature range, the calcining of the catalyst may not be completely performed.

Hereinafter, examples of the present invention are described in detail so that a person having ordinary skill in the art to which the invention pertains can easily implement the present invention. However, the present invention may be embodied in many different forms and is not limited to the examples described herein.

Example 1: Manufacturing of Ni Catalyst to which Ultrasonic Method was Applied 0.035 mol of a Ni precursor (Ni nitrate), a zeolite carrier, and a precipitant (urea) were added to 500 mL of distilled water at room temperature. After that, mixing was performed for 30 minutes with ultrasonics of 150 W and 20 kHz. The mixed solution was aged at 80° C. to 90° C. for 60 minutes with stirring. The manufactured catalyst was calcined at 400° C.

Example 2: Manufacturing of Ni Catalyst to which Ultrasonic Method was Applied 0.035 mol of a Ni precursor (Ni nitrate), a zeolite carrier, and a precipitant (KOH) were added to 500 mL of distilled water at room temperature. After that, mixing was performed for 30 minutes with ultrasonics of 150 W and 20 kHz. The mixed solution was aged at 80° C. to 90° C. for 60 minutes with stirring. The manufactured catalyst was calcined at 400° C.

Example 3: Manufacturing of Ni Catalyst to which Ultrasonic Method was Applied 0.0525 mol of a Ni precursor (Ni nitrate), a zeolite carrier, and a precipitant (KOH) were added to 500 mL of distilled water at room temperature. After that, mixing was performed for 30 minutes with ultrasonics of 150 W and 20 kHz. The mixed solution was aged at 80° C. to 90° C. for 60 minutes with stirring. The manufactured catalyst was calcined at 400° C.

Example 4: Manufacturing of Ni Catalyst to which Ultrasonic Method was Applied 0.0875 mol of a Ni precursor (Ni nitrate), a zeolite carrier, and a precipitant (KOH) were added to 500 mL of distilled water at room temperature. After that, mixing was performed for 30 minutes with ultrasonics of 150 W and 20 kHz. The mixed solution was aged at 80° C. to 90° C. for 60 minutes with stirring. The manufactured catalyst was calcined at 400° C.

Example 5: Manufacturing of Ni Catalyst to which Ultrasonic Method was Applied 0.1225 mol of a Ni precursor (Ni nitrate), a zeolite carrier, and a precipitant (KOH) were added to 500 mL of distilled water at room temperature. After that, mixing was performed for 30 minutes with ultrasonics of 150 W and 20 kHz. The mixed solution was aged at 80° C. to 90° C. for 60 minutes with stirring. The manufactured catalyst was calcined at 400° C.

Comparative Example 1: Manufacturing of Ni Catalyst by Impregnation

A catalyst was manufactured by impregnation by adding Ni-nitrate precursor solution to a zeolite carrier, calcined at 400° C.

Comparative Example 2: Ni Catalyst to which Ultrasonic Method without Aging Process was Applied 0.035 mol of a Ni precursor (Ni nitrate), a zeolite carrier, and a precipitant (urea) were added to 500 mL of distilled water at room temperature. After that, mixing was performed for 30 minutes with ultrasonics of 150 W and 20 kHz. The manufactured catalyst was calcined at 400° C.

Comparative Example 3: Ni Catalyst to which High Frequency Ultrasonic Method was Applied 0.0875 mol of a Ni precursor (Ni nitrate), a zeolite carrier, and a precipitant (KOH) were added to 500 mL of distilled water at room temperature. After that, mixing was performed for 30 minutes with ultrasonics of 600 W and 20 kHz. The mixed solution was aged at 80° C. to 90° C. for 60 minutes with stirring. The manufactured catalyst was calcined at 400° C.

Experimental Example 1: Ammonia Decomposition Reaction Activity Experiment 150 to 250 μm of a catalyst manufactured for the ammonia decomposition activity experiment was prepared. Then, the catalyst and the diluent were mixed and filled in the center of the quartz reactor. The temperature of the catalyst bed center was checked by TC. The catalytic reduction was performed at 700° C. in a 20% $H_2/N_2$ atmosphere, and a reaction experiment was performed at a space velocity of 15,000 ml/$g_{cat}$·h at 700° C. to 450° C.

Table 1 below shows data obtained by comparing ammonia conversion rates for each reaction temperature. Specifically, Table 1 is data showing amounts with respect to 97.5 to 100% at 700° C. when experiments were conducted at 450° C., 500° C., 550° C., 600° C., 650° C., and 700° C.

TABLE 1

| | 700° C. | 650° C. | 600° C. | 550° C. | 500° C. | 450° C. |
|---|---|---|---|---|---|---|
| Example 1 | 100 | 99.70 | 88.08 | 53.08 | 29.14 | 14.17 |
| Example 2 | 100 | 99.75 | 94.27 | 65.43 | 36.79 | 19.03 |
| Example 3 | 100 | 100 | 97.95 | 75.91 | 44.85 | 21.52 |
| Example 4 | 100 | 100 | 99.17 | 86.63 | 51.63 | 26.75 |
| Example 5 | 100 | 100 | 99.42 | 82.24 | 45.48 | 22.93 |
| Comparative Example 1 | 100 | 93.33 | 62.75 | 34.12 | 16.83 | 8.93 |
| Comparative Example 2 | 97.5 | 79.66 | 48.66 | 25.03 | 13.85 | 7.80 |

Referring to Table 1, it can be seen that the higher the temperature, the higher the ammonia conversion rate, and it can be seen that, at the lowest temperature of 450° C., Examples 1 to 5 and Comparative Examples 1 to 2 all show low ammonia conversion rates of less than 30%. It can be seen that the Example that shows the highest activity among Examples 1 to 5 is Example 4, which show a conversion rate of 85% or more up to 550° C. and has a conversion rate higher by 50% or more compared to Comparative Example 1 and higher by 60% or more compared to Comparative Example 2. Differences in the result values shown in the above-described experimental data can exhibit difference in the effects in the ammonia decomposition efficiency or the like described below.

Figure 2:
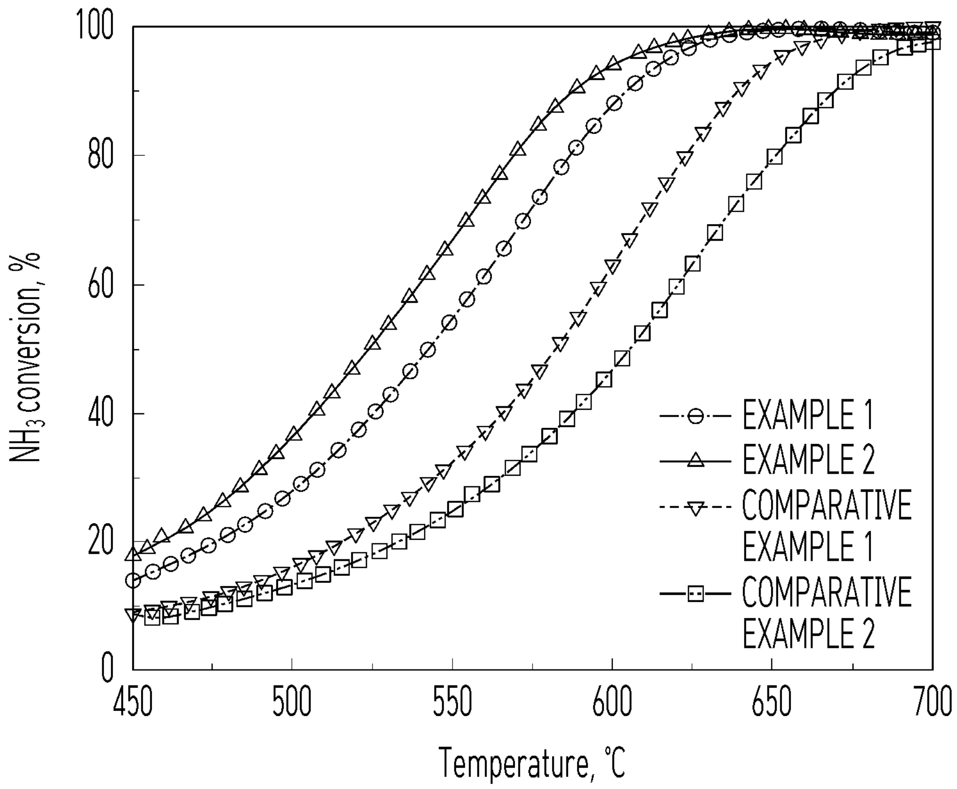
FIG. 2 shows a comparison of ammonia decomposition activity according to a catalyst synthesis method according to an embodiment of the present invention. (H 2 red=700° C. WHSV 15,000 mL/g cat h reaction temperature, 700° C. to 450° C.)

FIG. 2 is data obtained by comparing the ammonia decomposition activities of the metal composite catalysts of Examples 1 and 2 and Comparative Examples 1 and 2 of the present application. By the comparison between Comparative Example 1 and Example 1, it is possible to find the result data for the difference between the impregnation and the ultrasonic method. By the comparison between Comparative Example 2 and Example 1, it is possible to find the result data for the difference in presence of absence of aging. It is possible to find the result data for the precipitant difference with Examples 1 and 2.

Figure 3:
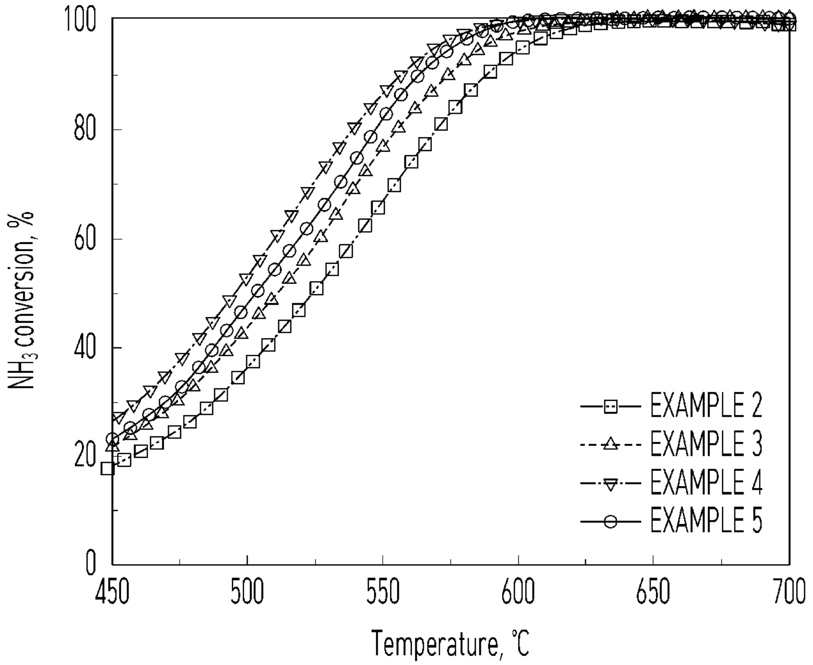
FIG. 3 shows a comparison of ammonia decomposition activities depending on the active metal content according to an embodiment of the present invention ($H_2$ red=700° C. WHSV 15,000 mL/$g_{cat}$·h reaction temperature, 700° C. to 450° C.)

FIG. 3 is data obtained by comparing the ammonia decomposition activities according to the active metal contents of Examples 2 to 5 of the present application.

Figure 4:
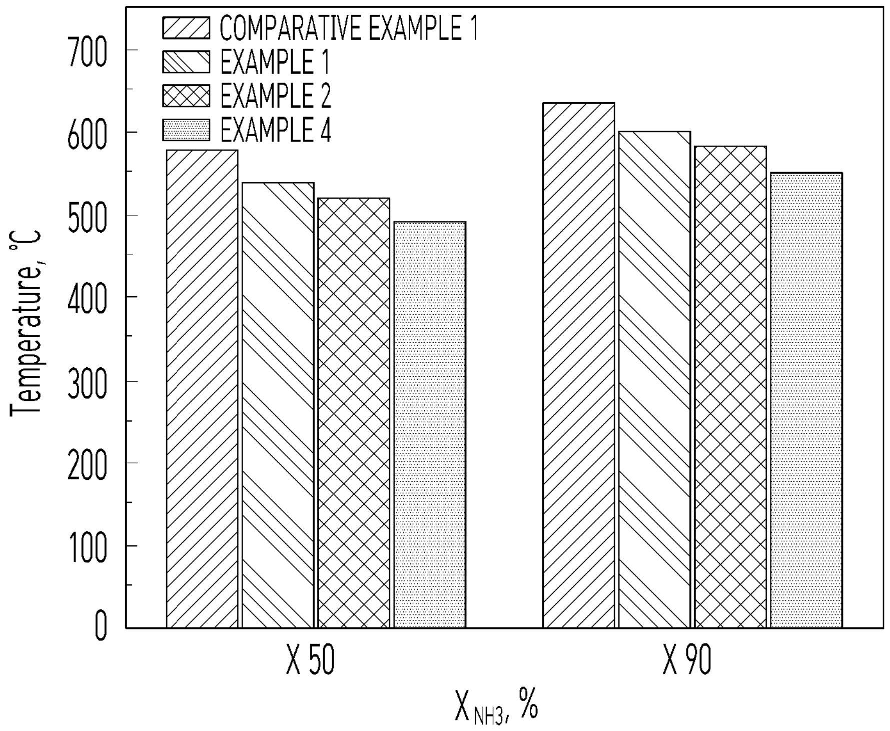
FIG. 4 shows a comparison of ammonia decomposition reaction temperatures of catalysts by a method of manufacturing a metal composite catalyst according to an embodiment of the present invention. $X_{50}$ is the temperature when $NH_3$ conversion is 50%, and $X_{90}$ is the temperature when $NH_3$ conversion is 90%.

FIG. 4 is data obtained by comparing ammonia decomposition reaction temperatures according to the catalyst manufacturing method of Comparative Example 1 and Examples 1 to 4 of the present application. Table 2 below shows data obtained by comparing ammonia decomposition reaction temperatures according to the catalyst manufacturing method described above. Specifically, Table 2 is data obtained by comparing Examples 1, 2, and 4 with Comparative Example 1.

TABLE 2

| | $X_{50}$ | $X_{90}$ |
|---|---|---|
| Example 1 | 543° C. | 607° C. |
| Example 2 | 525° C. | 589° C. |
| Example 4 | 497° C. | 557° C. |
| Comparative Example 1 | 583° C. | 641° C. |

Referring to Table 2 and FIG. 4, the temperatures when the ammonia decomposition reaction was completed by 50% and the temperatures when the ammonia decomposition reaction was completed by 90% can be found. Example 4 showed a high ammonia decomposition conversion rate at the lowest temperature, thereby indicating that Example 4 had the most excellent low-temperature activity required for ammonia decomposition. In addition, in the case of other examples, it was confirmed that $X_{50}$ and $X_{90}$ had temperatures of less than 550° C. and less than 610° C., respectively, compared to Comparative Example 1, and thus it was confirmed that other examples had low temperature activities in an excellent level.

Figure 5:
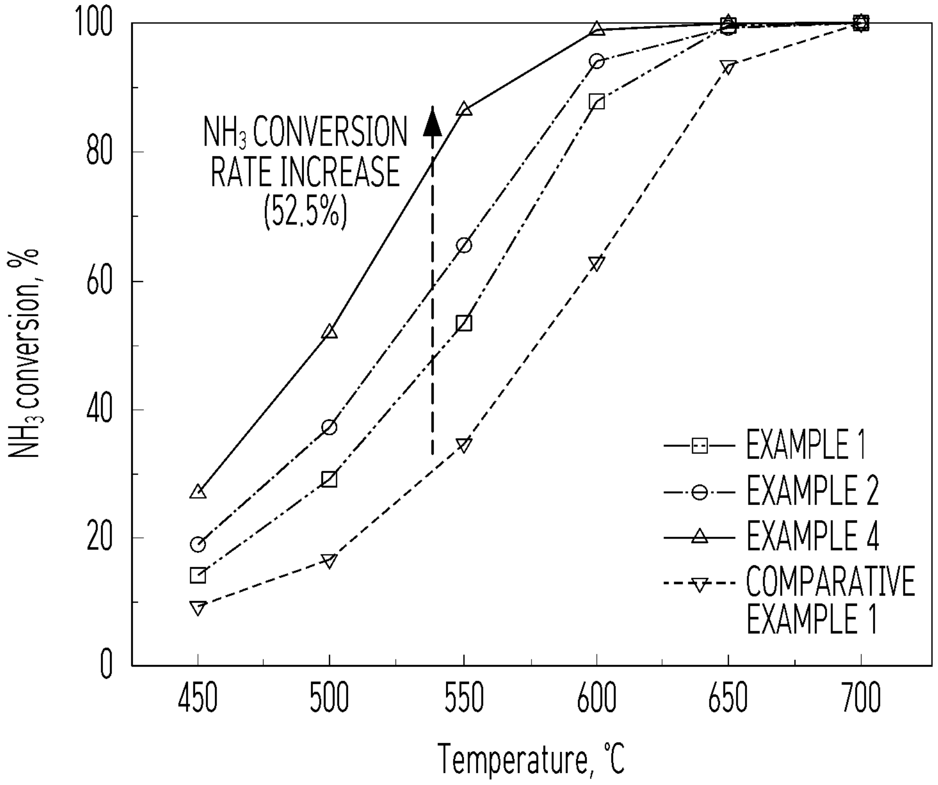
FIG. 5 shows a comparison of ammonia decomposition activities of a catalyst by a catalyst manufacturing method according to an embodiment of the present invention and a catalyst of a comparative example.
Figure 6:
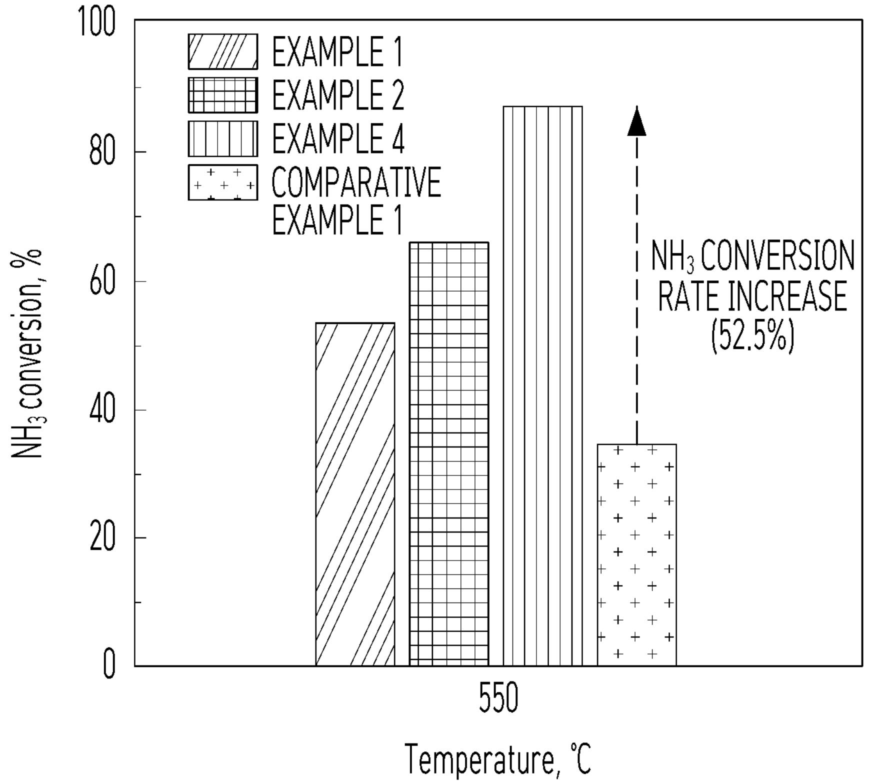
FIG. 6 shows a comparison of the ammonia decomposition activities of a catalyst by a catalyst manufacturing method according to an embodiment of the present invention and a catalyst of a comparative example.

FIGS. 5 and 6 are data obtained by comparing ammonia decomposition activities according to the catalyst manufacturing method of Comparative Example 1 and Examples 1 to 4 of the present application. The metal composite catalyst according to the invention of the present application is manufactured by the ultrasonic method, and Examples 1, 2, and 4 that are the manufactured catalysts showed generally more excellent ammonia decomposition activities than that of Comparative Example 1 that was the catalyst manufactured by impregnation. In addition, the ammonia conversion rate at a low temperature was increased by nearly 53% in Example 4, which is a 50 wt % Ni-supported catalyst, compared to that in Comparative Example 1, which is a 20 wt % Ni-supported catalyst manufactured by the impregnation.

Figure 7:
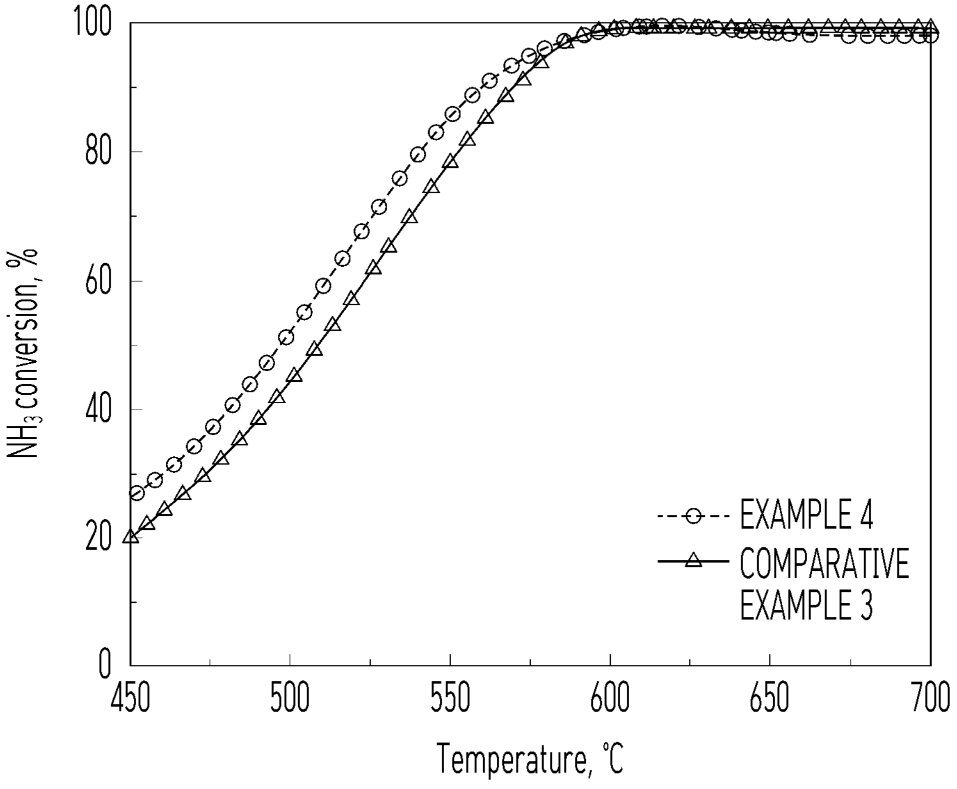
FIG. 7 shows a comparison of catalyst activities depending on ultrasonic output values at the time of manufacturing a composite catalyst according to an embodiment of the present invention.

FIG. 7 is data obtained by comparing the ammonia decomposition reaction catalytic activities according to the catalyst manufacturing method of Example 4 and Comparative Example 3 of the present application. It can be seen that particles are generated with a power of 100 to 600 W to the dispersion solution, most preferably with a power of 100 to 400 W.

Table 3 below shows the result data of Experimental Example 1 and shows metal contents, BET, total pore volumes, metal dispersions, metal surface areas, and particle sizes which are catalyst characteristics.

TABLE 3

| | Ni Content[a] (%) | BET[b] ($m^2$/g) | Total Pore Volume[b] $cm^3$/g) | Metal Dispersion[c] (%) | Metal Surface Area [c] ($m^2$/g) | Particle Size [c] (nm) |
|---|---|---|---|---|---|---|
| Comparative Example #1 | 20.0 | 3.9 | 0.06 | 0.10 | 0.14 | 974.96 |
| Comparative Example #2 | 2.6 | 507.1 | 0.50 | 1.50 | 0.26 | 67.12 |
| Example #1 | 18.0 | 634.7 | 0.38 | 3.03 | 3.64 | 33.38 |
| Example #2 | 17.4 | 196.3 | 0.19 | 2.68 | 3.09 | 37.95 |
| Example #3 | 27.3 | 164.8 | 0.18 | 3.01 | 5.62 | 32.67 |
| Example #4 | 39.3 | 233.0 | 0.29 | 4.35 | 11.40 | 23.27 |
| Example #5 | 57.9 | 184.4 | 0.24 | 3.40 | 13.13 | 29.72 |

Referring to Table 3, the catalyst manufactured in Comparative Example 1 using the impregnation has a very low specific surface area, a very low metal dispersion, and a large particle size compared to Examples 1 and 2, which are the same 20 wt % Ni-supported catalysts. Example 1 and Comparative Example 2 were supported by the ultrasonic method in the same way, but showed a significant difference by more than 5 times in the Ni metal support amounts depending on whether aging was applied. From this, it can be seen that the ultrasonic method and aging should be performed in parallel for a higher ammonia decomposition activity. Among Example 1 (urea) and Example 2 (KOH) which had similar Ni support amounts but different precipitants, Example 2, which is a catalyst manufactured with KOH, showed a higher ammonia decomposition activity by 10%. It can be seen that the Ni metal dispersion increases and the Ni particle size decrease on the surface of the support despite the increase in Ni content. According to this, it can be seen that Example 4, which is a 50 wt % Ni catalyst, has the largest specific surface area, a high metal dispersion, and a small Ni particle size.

The above description of the present invention is provided for illustrative purposes, and a person having ordinary skill in the art to which the invention pertains can understand that the present invention can be easily modified into other specific forms without changing the technical spirit or essential features of the present invention. Therefore, the examples described above should be understood as illustrative in all respects and not limiting. For example, each component described in a singular form may be implemented in a dispersed manner, and similarly, and components described as dispersed may be implemented in a combined form.

The scope of the present invention is indicated by the following claims, and all changes or modifications derived from the meaning and scope of the claims and equivalent concepts should be interpreted as being included in the scope of the present invention.

According to an example of the present invention, ultrasonic energy is applied to a precursor solution for supporting active metal to induce the formation of fine bubbles in the solution, continuous growth and cleaving in the precursor solution by ultrasonic cavitation, thereby enabling uniform formation of nano-sized particles on the surface of the carrier.

According to the present invention, it is possible to uniformly support 30 wt % or more of Ni metal, which is difficult to uniformly support highly dispersed active metals with a traditional catalyst manufacturing method, on the surface of a carrier by an ultrasonic treatment by an impregnation method.

According to the present invention, 50 wt % or more of Ni catalyst that is highly dispersed and uniformly supported is manufactured by combining ultrasonic energy and a short aging step, and the optimal precipitant can be selected.

The effects of the present invention are not limited to the above-described effects and should be understood to include all effects that can be inferred from the configuration of the invention described in the description of the present invention or the claims.

While the present invention has been described with respect to the specific embodiments, it will be apparent to those skilled in the art that various changes and modifications may be made without departing from the spirit and scope of the invention as defined in the following claims.

What is claimed is:

1. A metal composite catalyst for ammonia decomposition and hydrogen production comprising:

a carrier; and

Ni metal particles dispersed on a surface of the carrier or inside a pore, wherein a content of the Ni metal particle is 15 to 70 parts by weight with reference to 100 parts by weight of the metal composite catalyst, wherein a diameter of the Ni metal particles is 60 nm or less, and wherein a metal dispersion of the Ni metal particles in the metal composite catalyst is 1.6% to 10%.

2. The metal composite catalyst for ammonia decomposition and hydrogen production according to claim 1, wherein a BET surface area of the metal composite catalyst is 130 to 700 $m^2$/g.

3. The metal composite catalyst for ammonia decomposition and hydrogen production according to claim 1, wherein a total pore volume of the metal composite catalyst is 0.10 or more and less than 0.50 $cm^3$/g.

4. The metal composite catalyst for ammonia decomposition and hydrogen production according to claim 1, wherein a metal surface area of the metal composite catalyst is 2 to 20 $m^2$/g.

5. The metal composite catalyst for ammonia decomposition and hydrogen production according to claim 1, wherein the carrier is zeolite or, an oxide of at least one transition metal selected from the group consisting of magnesium, aluminum, iron, manganese, nickel, cobalt, titanium, silicon, and zinc.

6. The metal composite catalyst for ammonia decomposition and hydrogen production according to claim 1, wherein the Ni metal particles are dispersed on the surface of the carrier or inside the pore by applying ultrasonics.

7. The metal composite catalyst for ammonia decomposition and hydrogen production according to claim 6, wherein, after the ultrasonic is applied, the metal composite catalyst for ammonia decomposition and hydrogen production is aged in a liquid phase.

8. A method of manufacturing the metal composite catalyst for ammonia decomposition and hydrogen production of claim 1, the method comprising:

preparing a mixture by adding a Ni precursor, the carrier, and a precipitant to a solvent;

applying an ultrasonic to the mixture;

aging the mixture to which ultrasonics are applied; and calcining the aged mixture, thereby obtaining said metal composite catalyst.

9. The method of manufacturing a metal composite catalyst for ammonia decomposition and hydrogen production according to claim 8, wherein the precipitant is a base solution.

10. The method of manufacturing a metal composite catalyst for ammonia decomposition and hydrogen production according to claim 8, wherein the precipitant is urea, potassium hydroxide (KOH), sodium hydroxide (NaOH), or ammonia water.

11. The method of manufacturing a metal composite catalyst for ammonia decomposition and hydrogen production according to claim 8, wherein in the applying of ultrasonics to the mixture, an output of energy of the ultrasonics is 100 to 600 W.

12. The method of manufacturing a metal composite catalyst for ammonia decomposition and hydrogen production according to claim 8, wherein the applying of the ultrasonics to the mixture is performed for 10 minutes to 60 minutes.

13. The method of manufacturing a metal composite catalyst for ammonia decomposition and hydrogen production according to claim 8, wherein, in the aging of the mixture to which the ultrasonics are applied, the mixture is stirred at a temperature condition of 80° C. to 90° C. and aged.

14. The method of manufacturing a metal composite catalyst for ammonia decomposition and hydrogen production according to claim 8, wherein, in the aging of the mixture to which the ultrasonics are applied, the mixture is stirred for 20 to 180 minutes and aged.

* * * * *